United States Patent [19]

Schaefer

[11] Patent Number: 4,813,343

[45] Date of Patent: Mar. 21, 1989

[54] RINGLESS PISTON CONSTRUCTION

[76] Inventor: Kenn A. Schaefer, 1255 Emerald Dr., Hartford, Wis. 53027

[21] Appl. No.: 149,612

[22] Filed: Jan. 28, 1988

[51] Int. Cl.⁴ .................................................. F16J 9/00
[52] U.S. Cl. .......................................... 92/243; 92/245; 92/247
[58] Field of Search .................. 92/175, 192, 193, 194, 92/201, 240, 241, 242, 243, 245, 247, 249, 250, 254

[56] References Cited

U.S. PATENT DOCUMENTS

| | | | |
|---|---|---|---|
| 1,577,732 | 3/1926 | Lamb | 92/241 |
| 1,718,474 | 6/1929 | McQuaid | 92/243 |
| 1,840,880 | 1/1932 | Black | 92/249 |
| 2,163,162 | 6/1939 | Wells | 92/254 |
| 2,175,442 | 10/1939 | Miller | 92/254 |
| 2,473,064 | 6/1949 | Leman | 92/243 |
| 2,487,390 | 11/1949 | Smith | 92/254 |
| 2,793,921 | 5/1957 | Phipps | 92/254 |
| 3,094,904 | 6/1963 | Healy | 92/241 |
| 3,172,341 | 3/1965 | Garrett | 92/254 |
| 3,783,748 | 1/1974 | Cunningham | 92/249 |
| 3,902,405 | 9/1975 | Costarella et al. | 92/192 |
| 4,075,935 | 2/1978 | Panigati | 92/243 |
| 4,088,328 | 5/1978 | Roeder | 417/392 |
| 4,185,840 | 1/1980 | Hertz, Jr. | 92/250 |
| 4,205,595 | 6/1980 | Hafner et al. | 92/248 |
| 4,209,285 | 6/1980 | Jasinski et al. | 92/240 |
| 4,214,507 | 7/1980 | Hock et al. | 92/254 |

FOREIGN PATENT DOCUMENTS

| | | | |
|---|---|---|---|
| 0895103 | 3/1972 | Canada | 92/249 |
| 0197808 | 8/1978 | Netherlands | 92/249 |
| 0225627 | 10/1967 | U.S.S.R. | 92/249 |

Primary Examiner—Robert E. Garrett
Assistant Examiner—Thomas Denion
Attorney, Agent, or Firm—Andrus, Sceales, Starke & Sawall

[57] ABSTRACT

An improved ringless piston construction having particular use in a closed fluid system. The piston includes a metal core, which is attached to a piston rod, and a resilient outer member is secured to the core and is formed from a material, such as nitrile rubber. The outer member includes an outer peripheral surface and at least one of the axial ends of the outer surface is provided with a tapered lip. The resilient outer member also includes an inner flange that is spaced radially inward of the base of the lip, and the lip and flange, in combination, define an annular recess having outwardly diverging walls. When subjected to fluid pressure, the lip will be deformed outwardly into sealing engagement with the inner wall of the cylinder, while the flange acts to deflect the fluid toward the lip to increase the sealing pressure.

6 Claims, 1 Drawing Sheet

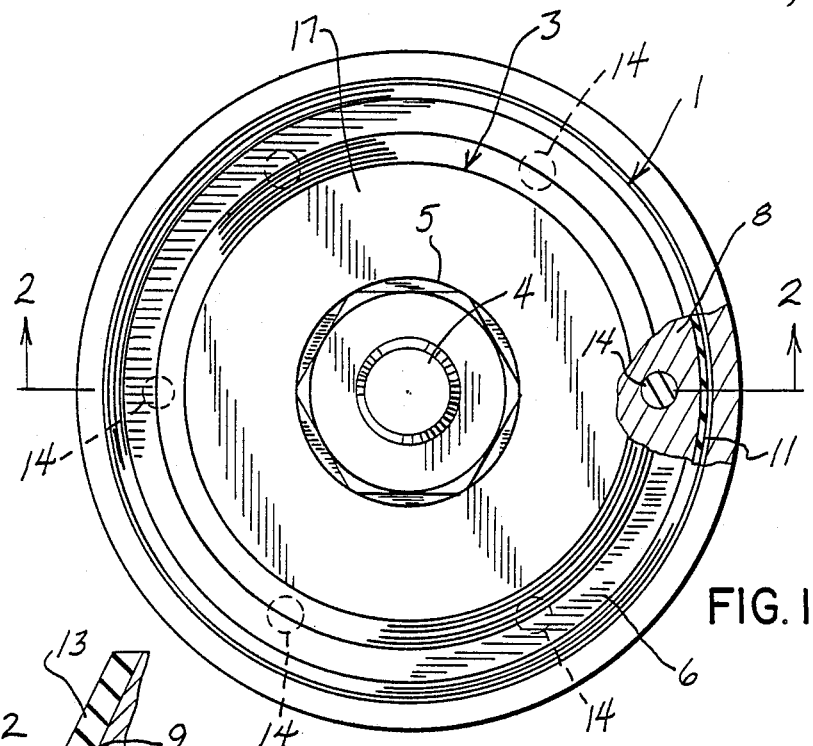
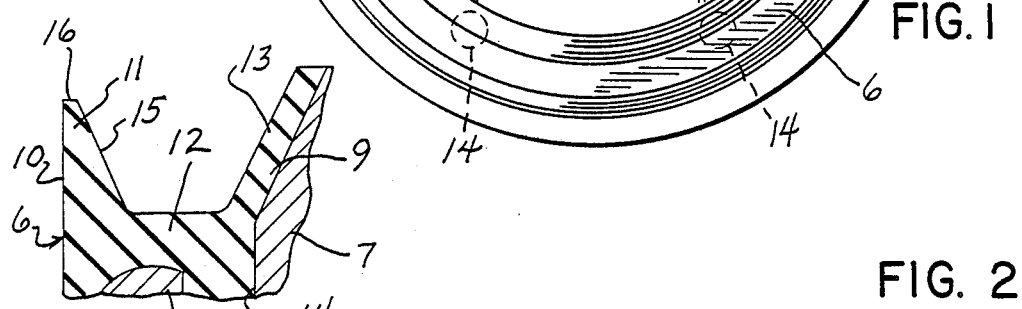
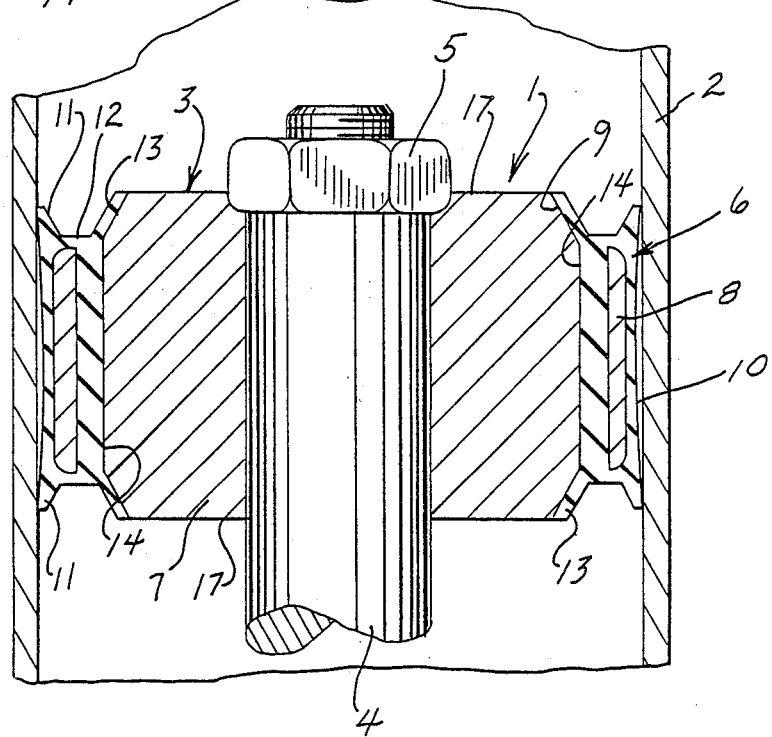
FIG. 1
FIG. 2
FIG. 3

RINGLESS PISTON CONSTRUCTION

BACKGROUND OF THE INVENTION

There are a wide variety of piston configurations in current use. A common type is one that employs several packings at each end of the piston with a retainer made of Teflon, or hard rubber, along with backup rings. Other piston configurations employ O-rings and U-rings in tandem with backup rings, while other pistons have split-type rings and quad-type seals made of rubber. On heavier equipment, such as automobile engines, split cast iron piston rings are used which require a tool to collapse the rings for entry into the cylinder. The use of seals, O-rings and packings add considerable overall cost to the piston construction.

It has also been proposed to use ringless pistons for certain applications. In pistons of this type, a rubber or resilient outer section is either chemically bonded or mechanically interlocked with a metal core, and the outer resilient section is provided with lips which, under fluid pressure, are adapted to engage and ride against the walls of the cylinder. The conventional ringless pistons have seen primary use in pumping abrasive materials, such as concrete to a specific location and have not seen extensive use in closed flow hydraulic systems.

U.S. Pat. No. 3,902,405 describes a ringless piston for use in a hydraulic system. The piston, as described in that patent, is formed of a material, such as polyurethane, and is provided with a running clearance with the cylinder wall, meaning that under unpressurized conditions, the lip of the seal will be spaced from the cylinder wall. However, it has been found that pistons utilizing materials, such as polyurethane, nylon, or other thermoplastic materials, cannot be satisfactorily operated at elevated temperatures above 250° F. or 300° F., as these polymers become gummy and tend to deteriorate.

SUMMARY OF THE INVENTION

The invention is directed to an improved ringless piston construction having particular use in closed fluid systems where temperatures can range up to 400° F. The piston construction includes a metal core having a central opening to receive a piston rod and an outer resilient member is secured to the core and formed from a material, such as nitrile rubber. This material has a hardness in the range of 60 to 80 durometer and is capable of withstanding temperatures in the range of −40° F. to 375° F. without deterioration or permanent deformation.

The outer resilient section of the piston has a slightly concave outer peripheral surface and at least one of the axial ends of the peripheral surface is formed with a tapered lip. The resilient section also includes an inner flange that is spaced radially inward from the base of the lip and the lip in combination with the flange define an annular recess having diverging side walls.

Under pressurized conditions, the lip will be deformed outwardly into contact with the inner wall of the cylinder, and as the pressure within the cylinder is increased, a greater portion of the lip is expanded outwardly into wiping and sealing contact with the cylinder wall. Thus, an increasing sealing area is provided as the pressure is increased. The annular flange, which is spaced radially inward of the lip, acts to deflect the fluid toward the lip to increase the sealing effect.

The peripheral surface of the outer section of the piston has a substantial axial length providing maximum support for side loading which, in turn, prolongs the life of the piston rod gland seal.

As the metal core projects axially beyond the flexible lip, the lip is protected at the ends of the piston stroke.

The piston of the invention has particular application with drawnover mandrel electric welded tubing, for the piston can be used with the variable tolerances of the tubing without the need of honing of the tubing. There is no need to control the ovality of the tubing, as the flexible lips on the piston will conform to the internal surface of the tubing. Further, the tube camber causes no problem.

Because of the use of nitrile rubber as the outer piston section, the piston will performed satisfactorily at temperatures up to 400° F., thus enabling the piston to be used in closed loop hydraulic and pneumatic systems where temperatures can reach this value in the event of malfunction of the system.

Other objects and advantages will appear in the course of the following description.

DESCRIPTION OF THE DRAWINGS

The drawings illustrate the best mode presently contemplated of carrying out the invention.

In the drawings:

FIG. 1 is an end view of the piston construction of the invention with parts broken away;

FIG. 2 is a longitudinal section taken along line 2—2 of FIG. 1; and

FIG. 3 is a fragmentary enlarged section showing the construction of the piston.

DESCRIPTION OF THE PREFERRED EMBODIMENT

The drawings illustrate a piston 1, which is mounted for sliding movement within a cylinder or tube 2. The piston of the invention has particular application for use with a drawnover mandrel electric welded tube. The piston will function within the standard I.D. tolerances of the tube, without the need of honing the tube. Thus, there is no need to control the ovality of the tube and tube camber can be tolerated.

Piston 1 includes a core 3, formed of a metal such as steel or aluminum, and a piston rod 4 is mounted within a central opening in core 3 by a nut 5, which is threaded on the end of rod 4.

Piston 1 also includes an outer resilient section 6 which is secured to core 3. The outer section is formed of a material, such as nitrile rubber, which has a hardness in the range of about 60 to 80 durometer and is capable of withstanding temperatures up to about 400° F. without deterioration or permanent deformation.

Core 3 includes an inner section 7, and an outer section 8, which has a lesser axial length than inner section 7. Sections 7 and 8 are connected by an inclined or diagonal surfaces 9.

The outer resilient section 6 is provided with an outer peripheral surface 10, which is slightly concave and is disposed outwardly of outer section 8 of core 3, and the axial ends of peripheral surface 10 terminate in tapered lips 11. Outer section 6 also includes an intermediate position 12, which extends radially inward from the bases of the lips 11, and flanges 13 extend diagonally outward from section 12 and are secured against the diagonal surfaces 9 of core 3.

As illustrated in the drawings, the outer resilient section 6 is secured to core 3 by a mechanical interlock. In this regard, outer section 8 of core 3 is provided with plurality of circumferentially spaced axial holes 14 and the resilient nitrile rubber is molded to the outer surface of the core, as well as within the holes 14. As the nitrile rubber extends through the holes 14, a mechanical interlock is achieved between the outer member 6 and core 3. Alternately, the outer section 6 can be chemically bonded to the core 3.

As best shown in FIG. 3, lip 11 is bordered by the outer peripheral surface 10 and the inclined surface 15. The tip 16, where surfaces 10 and 15 converge, can either be chamfered or slightly rounded. As shown in FIG. 3, surface 15 extends at an angle of 20° to 45° and preferably 30° with respect to the outer peripheral surface 10.

Similarly, flange 13 extends at an angle of 20° to 45° and preferably about 30° with respect to the axis of the piston.

Lips 11 are formed so as to expand in more or less barrel-like fashion. The taper of the lips is determined so that the outermost diameter of the lip will expand outwardly at low pressures. As the pressure within the cylinder is increased, a greater portion of the outer surface of the lip is expanded outwardly into wiping and sealing contact with the cylinder wall. Thus, an increase in pressure results in an increased sealing area between the piston and the cylinder.

The flange 13, which is spaced radially inward from the lip 11, serves to deflect the fluid toward the lip to increase the sealing effect.

The outer peripheral surface 10 of section 6 has a substantial axial length which aids in preventing tilting of the shaft or side loading, thereby prolonging the life of the piston rod gland seal.

As shown in FIG. 2, the inner section 7 of core 3 has a greater axial length than the outer surface 10, so that the end surfaces 17 of section 7 proface 10, so that the end surfaces 17 of section 7 project axially beyond the tips 16 of the corresponding lips 11. This acts to protect the tips of the lips at the ends of the piston stroke.

The piston has particular application for use in closed flow hydraulic or pneumatic systems, where the temperature of the recirculating fluid can increase up to perhaps 400° F. in the event of a malfunction in the system. The piston can be used in heavy duty hydraulic cylinders, air cylinders, air compressors, refrigerant compressors, hydraulic jacks, automative power steering cylinders, shock absorbers, brake cylinders and the like. In applications where only one side of the piston is subjected to pressure, such as in hydraulic jacks, only one lip need be provided.

Various modes of carrying out the invention are contemplated as being within the scope of the following claims particularly pointing out and distinctly claiming the subject matter which is regarded as the invention.

I claim:

1. A piston construction for use in a closed loop fluid system, comprising a cylinder, a piston disposed for sliding movement in said cylinder, said piston including a metal core having a pair of end surfaces and having an outer cylindrical surface, said core also having a pair of frustoconical surfaces connecting the ends of the outer cylindrical surface with the respective end surfaces, the axial length of said outer cylindrical surface being greater than the combined axial lengths of said frustoconical surfaces, and a resilient member secured to said core, said resilient member including an outer peripheral surface disposed to engage the inner wall of said cylinder and having a tapered lip disposed at each axial end of said peripheral surface and terminating in an axial facing tip, said resilient member also including a frustoconical flange spaced radially inward from said lip, each lip and the corresponding flange defining an annular axial facing recess having diverging side walls, the pressure of a fluid within said cylinder acting to deform said lip outwardly into sealing engagement with the cylinder wall, each flange disposed in sealing engagement with the corresponding frustoconical surface of the core and each flange terminating in an axial facing extremity having a greater radial thickness than the axial facing tip of said lip.

2. The construction of claim 1, wherein the end surfaces of said core project axially beyond the corresponding tips of said lips.

3. The construction of claim 1, wherein the outer member is composed of nitrile rubber having a hardness of 60 to 80 durometer and capable of withstanding temperatures up to 400° F.

4. The construction of claim 1, wherein said lip is defined by said outer cylindrical surface and a second surface diverging from said outer surface, said surfaces being disposed at an angle of 20° to 45° with relation to each other.

5. The construction of claim 1, wherein said flange is disposed at an angle of 20° to 45° with respect to the axis of said piston.

6. The construction of claim 1, wherein the outer cylindrical surface is slightly concave.

* * * * *

UNITED STATES PATENT AND TRADEMARK OFFICE
CERTIFICATE OF CORRECTION

PATENT NO. : 4,813,343
DATED : March 21, 1989
INVENTOR(S) : KENN A. SCHAEFER

It is certified that error appears in the above-identified patent and that said Letters Patent is hereby corrected as shown below:

Col. 4, Line 37, CLAIM 3, Cancel "outer" and substitute therefor ---resilient; Col. 4, Line 43, CLAIM 4, After "outer" insert ---peripheral---

Signed and Sealed this

Nineteenth Day of December, 1989

Attest:

JEFFREY M. SAMUELS

*Attesting Officer*     *Acting Commissioner of Patents and Trademarks*